United States Patent [19]
Haag

[11] 3,910,435
[45] Oct. 7, 1975

[54] VEHICLE FOR THE TRANSPORTING OF CONTAINERS AND THE LIKE

[75] Inventor: Albert Haag, Mitteltal, Germany

[73] Assignee: Firma Karl Muller, Fahrzeugwerk, Mitteltal, Germany

[22] Filed: Dec. 5, 1973

[21] Appl. No.: 422,074

[30] Foreign Application Priority Data
Dec. 8, 1972   Germany............................ 2260224

[52] U.S. Cl. ........... 214/390; 214/317; 214/DIG. 4; 280/43.23
[51] Int. Cl.² ............................................. B60P 3/00
[58] Field of Search ........... 214/506, 390, 392, 394, 214/396, 314, 313, 317, 315, DIG. 1, DIG. 4; 280/43.23, 124 F; 180/24.02; 254/8 R

[56]   References Cited
UNITED STATES PATENTS
1,678,395   7/1928   Kellems ........................ 214/DIG. 4
2,974,972   3/1961   Hassell............................ 280/43.23

FOREIGN PATENTS OR APPLICATIONS
1,195,476   6/1970   United Kingdom.............. 280/43.23
1,375,875   9/1964   France................................ 214/390

*Primary Examiner*—Robert J. Spar
*Assistant Examiner*—Lawrence J. Oresky
*Attorney, Agent, or Firm*—Ernest G. Montague; Karl F. Ross; Herbert Dubno

[57]   ABSTRACT

The chassis of the vehicle for receiving, transporting and depositing containers consists of a main frame which is open towards the rear and is provided with supporting posts and supporting wheels, and of an auxiliary frame which bears the undercarriage. The auxiliary frame is pivoted to the main frame and is swingable rearward and upwards around the frame. When the vehicle is in condition ready for travel, the main frame is supported via the supporting posts on the auxiliary frame and during the receiving and depositing of the container it is supported via the supporting wheels on the ground. In order to receive a container which is standing on the ground, the vehicle is moved backwards to the container with the auxiliary frame raised, so that the container is straddled by the main frame. Upon the backward swinging of the auxiliary frame, the main frame is raised and thereby also raises the container.

16 Claims, 11 Drawing Figures

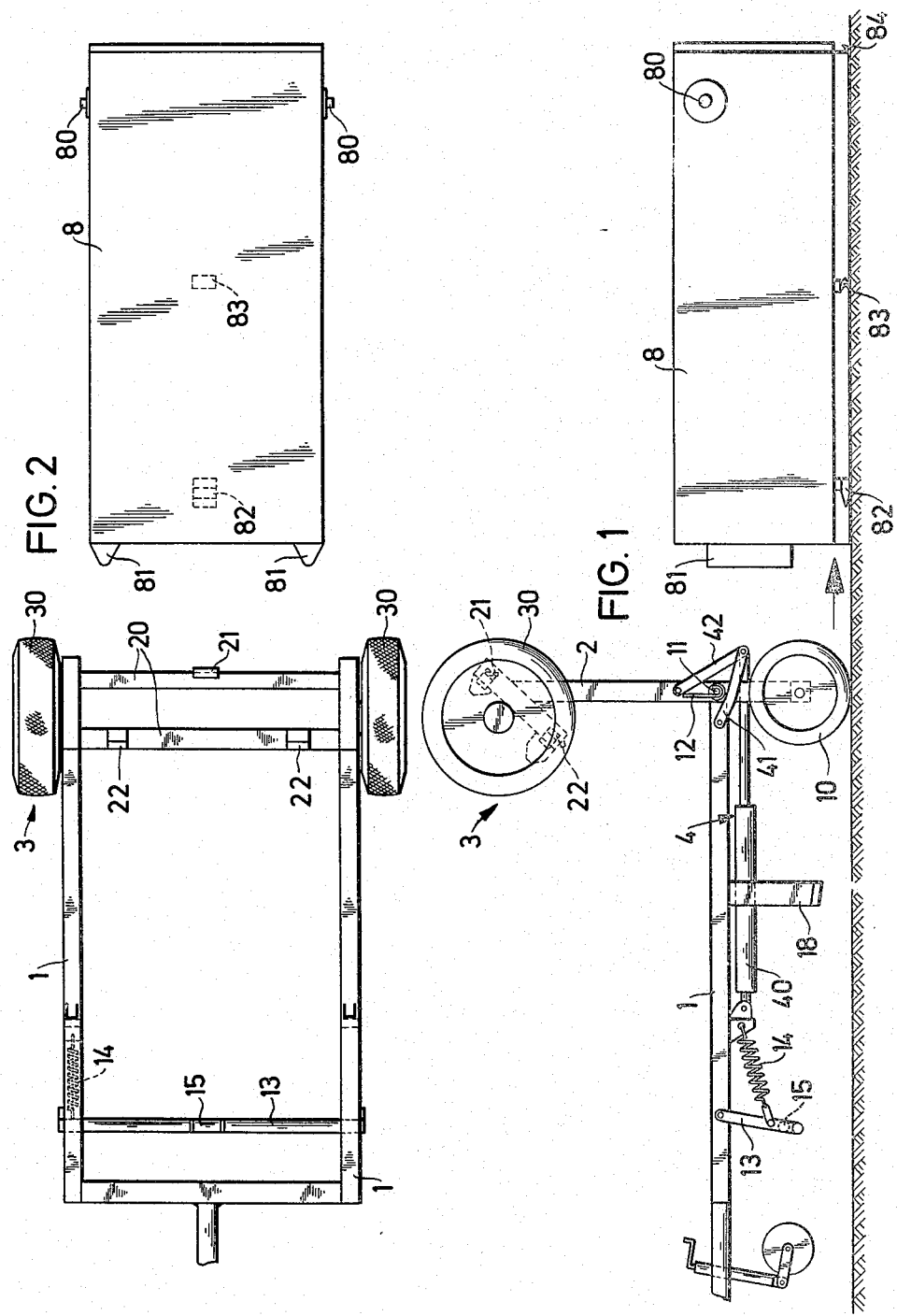

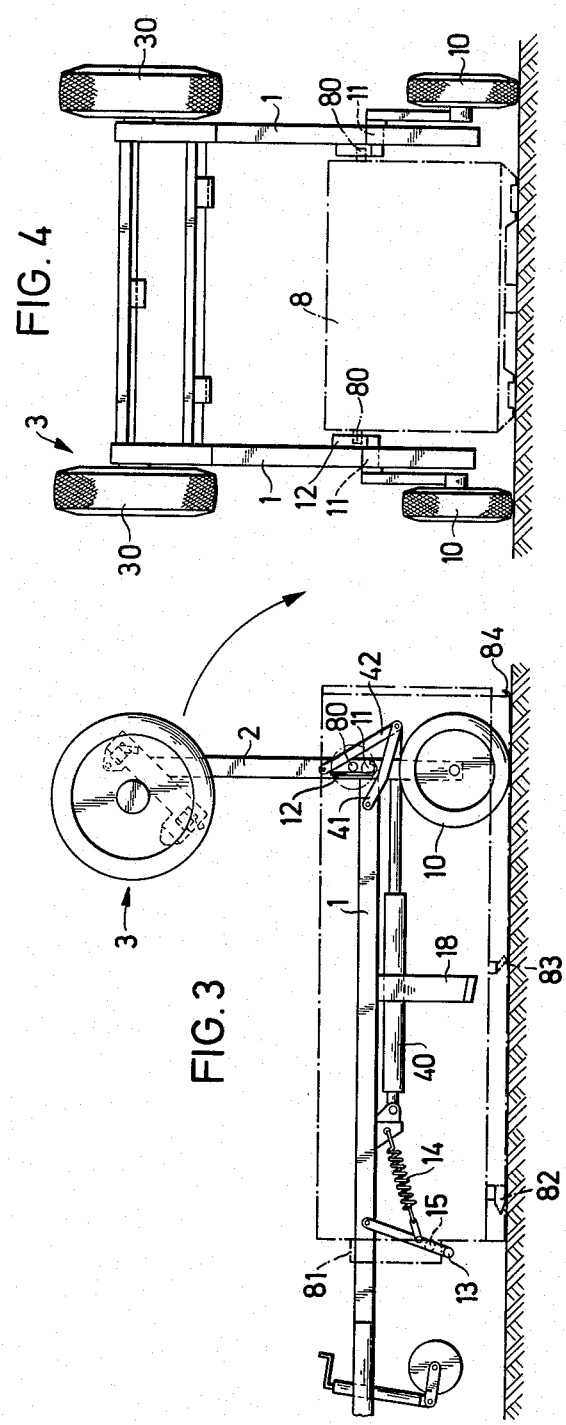

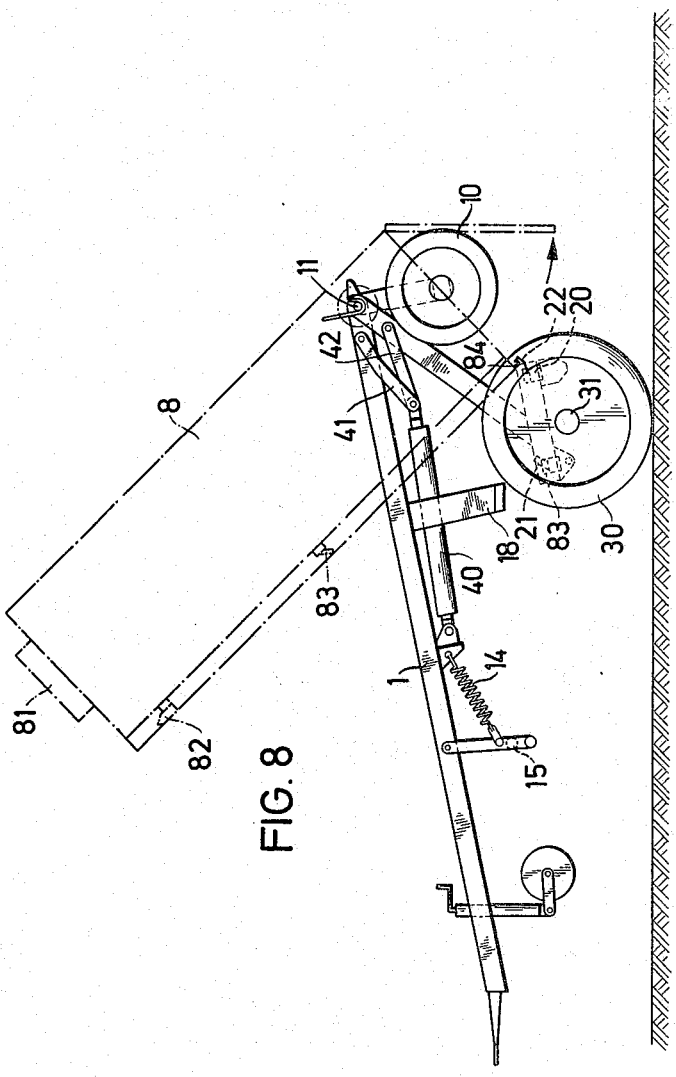

VEHICLE FOR THE TRANSPORTING OF CONTAINERS AND THE LIKE

The present invention relates to a vehicle for the transporting of containers.

Such vehicles are known, for instance, from German Patent No. 1,188,690 and German Patent publication No. 1,904,830. The advantage of these vehicles resides in that upon backing up, the object which is standing on the ground can be straddles by the frame which is open towards the rear and at the same time suspended in suitable mounts and then lifted from the ground by a lifting device.

The fundamental disadvantage of the known vehicles of this type is that the stability and rigidity of these vehicles are substantially less than that of vehicles in which the chassis has a closed frame instead of the open frame. Furthermore, it is not possible with these vehicles to provide a continuous axle for the rear wheels. The two rear wheels are therefore not fixed with respect to each other so that upon traveling over uneven land, considerable force or torque is applied on the fork frame, particularly if the fork frames are relatively long.

It is one object of the present invention accordingly to increase the rigidity and stability of the vehicle and to keep undesired loads and strains away from the frame.

It is possible according to the invention to provide the vehicle with a form, in which the U-shaped frame is open towards the rear in order to receive and deposit the object to be transported and yet enable it to act, for transportation, as a vehicle of high stability and rigidity having absolute trueness of track.

For very heavy and bulky objects, for instance a cable drum of approximately 4 meters in diameter, a particularly designed vehicle is provided.

These and other objects will become more readily apparent from the following description, reference being made to the accompanying drawing in which:

FIGS. 1 and 2 are a side view and a plan view, respectively, of a single-axle trailer upon rearward travel to take up a container;

FIGS. 3 and 4 are side and rear views after completion of the backward travel;

FIG. 8 is a side elevation in the final position upon dumping or tipping;

Figure 5:
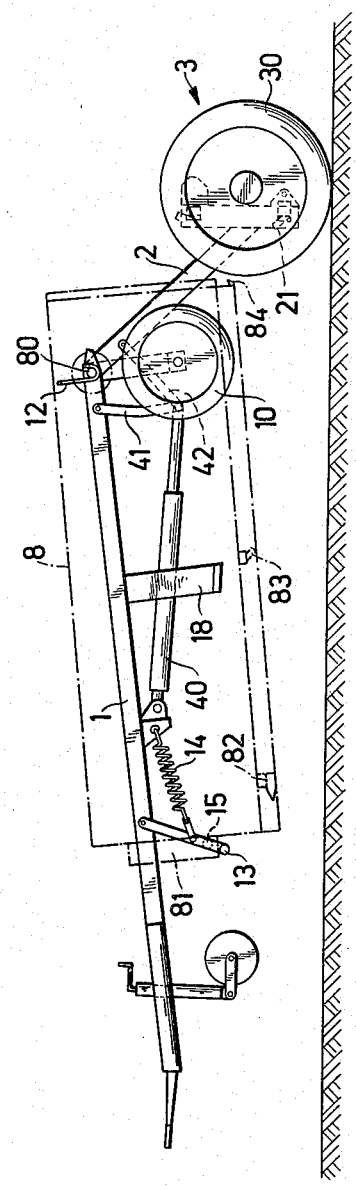
FIG. 5 is a side elevation during the taking on of the container.

As can be seen from FIGS. 1 and 2 a fork-shaped main frame 1, which is open towards the rear forms the front part of the chassis. An auxiliary frame 2 forming the rear part is connected to the front part on both sides by means of horizontal swivel shafts 11 (FIG. 4). As supporting members 10 there are provided a pair of supporting wheels which, in the case of the vehicle shown in FIGS. 1 to 9, are arranged at the rear end of the main frame 1. As, fastening means or mountings for the object which is to be received and transported, in the present case a container 8, a trough-like container support 12, which is open towards the top, is provided at the rear end of the main frame 1 laterally on both arms of the fork, while a swingable yoke 13, which hangs downward, is arranged in the front region. This yoke 13 is acted on by a spring 14, which urges the yoke 13 into a rearward swung position. In the center of the yoke 13 between the two arms of the frame 1 there is a roller 15. On each of the two arms of the frame 1 there is furthermore also provided a downwardly directed supporting post 18.

The side parts of the auxiliary main frames, which is pivoted to the frame 1, are rigidly connected to each other in both embodiments by two transverse members 20 at their ends. These transverse members 20 are so fastened to the rear auxiliary frame 2 that their plane of connection extends parallel to the path of travel when the vehicle is in the transport position. On one of the cross members 20, the front one in the i.e. embodiment shown at its center, there is arranged an upwardly directed yoke 21 and at the rear end of the rear transverse member advisedly on both sides, an upwardly directed locking hook 22, which can be brought into operating position by suitable means, for instance by a lever.

Figure 7:
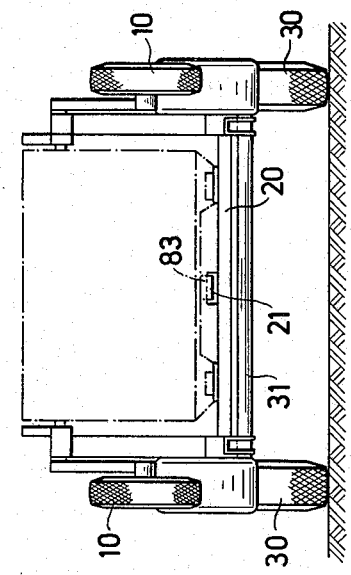
FIGS. 6 and 7 are side and rear views after the receiving of the container in a position for transportation.

An undercarriage 3 consists essentially of the wheels 30 arranged on the two sides and a continuous axle 31 (FIG. 7). The undercarriage 3 is rigidly fastened to the rear end of the auxiliary frame 2, preferably in such a manner, that the distance from the continuous axle 31 to the two cross members 20 is equal.

The dimensioning of the supporting wheels (supporting member 10) and of the wheels 30 as well as the distance between their supports and the pivot shaft 11 is so selected, that the auxiliary frame 2 of the chassis can be swung forward together with the undercarriage 3 below and between the supporting wheel 10.

A swivel device 4 (FIG. 3) consists of piston rams 40, one of which is fastened on each of the two sides of the frame 1, and of a pair of link arms formed of links 41 and 42. The front ends of the piston rams 40 are pivoted to the frame 1. At their rear ends they are pivotally connected with the front ends of the links 41 and 42. The rear ends of the upper links 41 are pivoted to the frame 1, and the rear links 42 to the auxiliary frame 2 of the chassis. In this way the auxiliary frame 2 with the undercarriage 3 can be swung through almost 270°. The piston rams 40 may be operated pneumatically or hydraulically.

The container 8 which is to be received and transported, e.g. a trough-shaped dump container, is provided on top in the vicinity of its rear end on each side with a suspension pin 80 or the like and at its front end with a mounting extension 81. The distance from the lower edge of the mounting extension 81 is somewhat smaller, than the height of the yoke 13. In the embodiment shown, the mounting extension 81 consists of two shaped members which are arranged directly on the side walls and have a surface extending obliquely to the walls of the container. By these oblique run-on surfaces in combination with run-on rollers arranged on the frame 1, the straddling of the container 8 upon rearward travel can be facilitated. On the bottom of the container 8 there are arranged the devices serving for the locking upon transportation and dumping, namely at the front and in the center a nose 82 and 83 and at the rear end a locking bolt 84. In case of objects of a different type, which do not need to be dumped, the locking bolt 84 can be eliminated.

Figure 6:
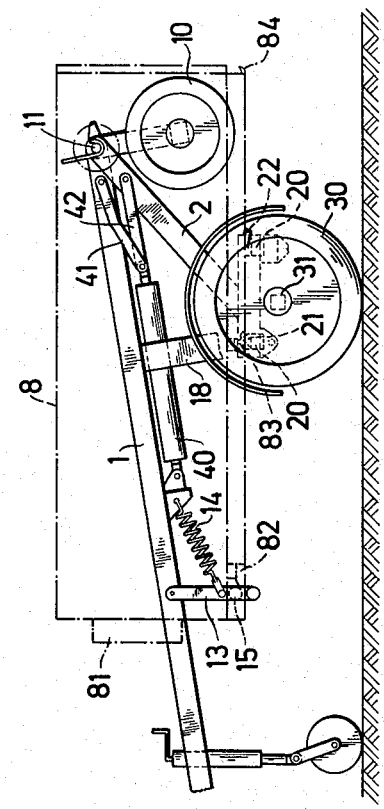

The manner of operation is as follows:

In order to bring the vehicle from the basic position which corresponds to the position shown in FIGS. 6 and 7, but without the container, into the position shown in FIGS. 1 and 2, in which it is ready to receive the container 8, which is standing on the ground, the swing device 4 is placed in operation, whereby the auxiliary frame 2 is swung towards the rear. The angle which the two links 41 and 42 form with each other and which is acute in the starting position pointing towards the rear gradually increases, as does the angle which the frame 1 and auxiliary frame 2 form with each other. In this connection the frame 1 inclines upward, the distance of the swivel axis 11 from the ground becoming greater until the auxiliary frame 2 comes into a vertical position, the wheels 30 coming to lie approximately below the supporting wheels (supporting member 10). During the course of the further swinging of the auxiliary frame 2 in counter-clockwise direction, the receiving position shown in FIGS. 1 and 2 is finally reached, in which position the open rear end of the frame 1 assumes an approximately horizontal position in which the distances from the container support 12 and the cross member of the yoke 13 to the ground are smaller than the distances from the suspension pin 80 receiving the container 8 and the lower edge of the mounting extensions 81.

The vehicle is now driven backward in the direction indicated by the arrow, the "threading" being facilitated by rollers arranged on the frame 1 and the oblique surfaces of the mounting extensions 81. The rearward travel is terminated when the end wall of the container comes into contact with the yoke 13. In this connection the suspension 80 lies above the container supports 12 (FIGS. 3 and 4).

The mounting of the container 8 is effected by the swinging of the auxiliary frame 2 in clockwise direction, as indicated by the arrow in FIG. 3. After the undercarriage 3 has reached the ground, the initially oblique angle between the frame 1 and the auxiliary frame 2 is made smaller, as a result of which the frame 1 is forced obliquely upward. In this connection the container supports 12 extend below the receiving pins 80. The bottom sides of the mounting extensions 81 come to rest on the cross member of the yoke 13. The container is thus suspended in the vehicle (FIG. 5). In the further course of the operation, the undercarriage 3 together with the auxiliary frame 2 of the chassis is swung away forward under the supporting wheels in the direction opposite to that described above. In this connection the nose 83 and the yoke 21 come into engagement. Shortly before reaching the transport position, the container 8 at its bottom approximately at the center comes into contact with the front cross member 20, so that upon the further forward movement of the auxiliary frame 2 and the related downward movement of the rear end of the frame 1 and of the container suspension, the front end of the container 8 is tilted somewhat upward and the mounting extensions 81 are lifted away from the yoke 13. The end of the container 8 below the mounting extensions 81 slides upward on the cross member of the yoke 13 until finally the lower edge of the end wall of the container has reached the height of the cross member of the yoke. The pull of the spring 14 then swings the yoke 13 back below the bottom of the container, the roller 15 being pulled between the nose 82 and the bottom of the container 8. At the same time, the supporting posts 18 also come to rest on the cross member. The piston rams 40 can now be relieved. In this way the transportation position is reached. Relative movements of the container 8 with respect to the vehicle are impossible due to the locking devices (roller 15, nose 82 and yoke 21, nose 83 respectively). The locking hook 22 does not enter into action during the processes described. It is locked in a disconnected position.

For the depositing of the container 8 on the ground, the undercarriage 3 together with the auxiliary frame 2 is swung rearward and upward around the swivel axis 11 in the manner described above, the rear edge of the container 8 first contacting the ground and the suspension pins 80 coming out of their container supports 12. The front end of the container 8 still hangs in the yoke 13 even after completion of the swing process and rests on the roller 15. Upon the following forward travel, the yoke 13 is pulled forward, as a result of which the container slips onto the ground.

When the container is to be brought into the dump position (FIG. 8), the locking hooks 22 must first of all be brought from the disconnect position into the position of readiness. This can be effected by a lever or the like. In this position they can be pressed upward by spring force. Thereupon the swinging process is initiated and continued until the locking hooks 22 come into engagement with the locking bolts 84. The auxiliary frame 2 together with the undercarriage 3 is now swung forward in clockwise direction back into the starting position. The lower rear edge of the container 8 is carried along towards the front due to the connection between the locking hook 22 and the locking bolt 84. The container 8 is tilted around the swinging axis 11, which is identical with the axis of the suspension pin 80. This has the advantage that the material being dumped falls onto the ground in a long-drawn-out heap.

The same inventive concept can also be utilized for particularly heavy and bulky objects with two-axle vehicles (FIGS. 9 and 10) which represent a cable car in the form of a trailer. The front and rear parts (frame 1 and auxiliary frame 2) of the chassis have grid-like supporting structures which consist essentially of lower bars 16 and 26 and upper bars 17 and 27. The front upper bars 17 are pivoted to the swivel shaft 11 at the rear lower bars 26, which are in each case shorter than the other bars 16 and 27, respectively. In the embodiment shown in the drawing, two pairs of rams are provided. The lower pair of rams has piston rams 46 on both sides, which extend approximately horizontally and act detachably approximately in the center of the bars 26. The upper pair of rams if formed of piston rams 47 arranged on both sides which are pivoted to the front ends of the bars 27. For the further connecting of the frame 1 to the auxiliary frame 2 of the chassis, an abutment 19 is fastened on the frame 1 on both sides and a tiebar 28 is pivoted to the auxiliary frame. For a cable car, one fastening means is sufficient, namely a drum support 12a fastened to both sides of the frame 1 and located preferably approximately in the center between the wheels 30 and a front undercarriage 5.

Figure 9:
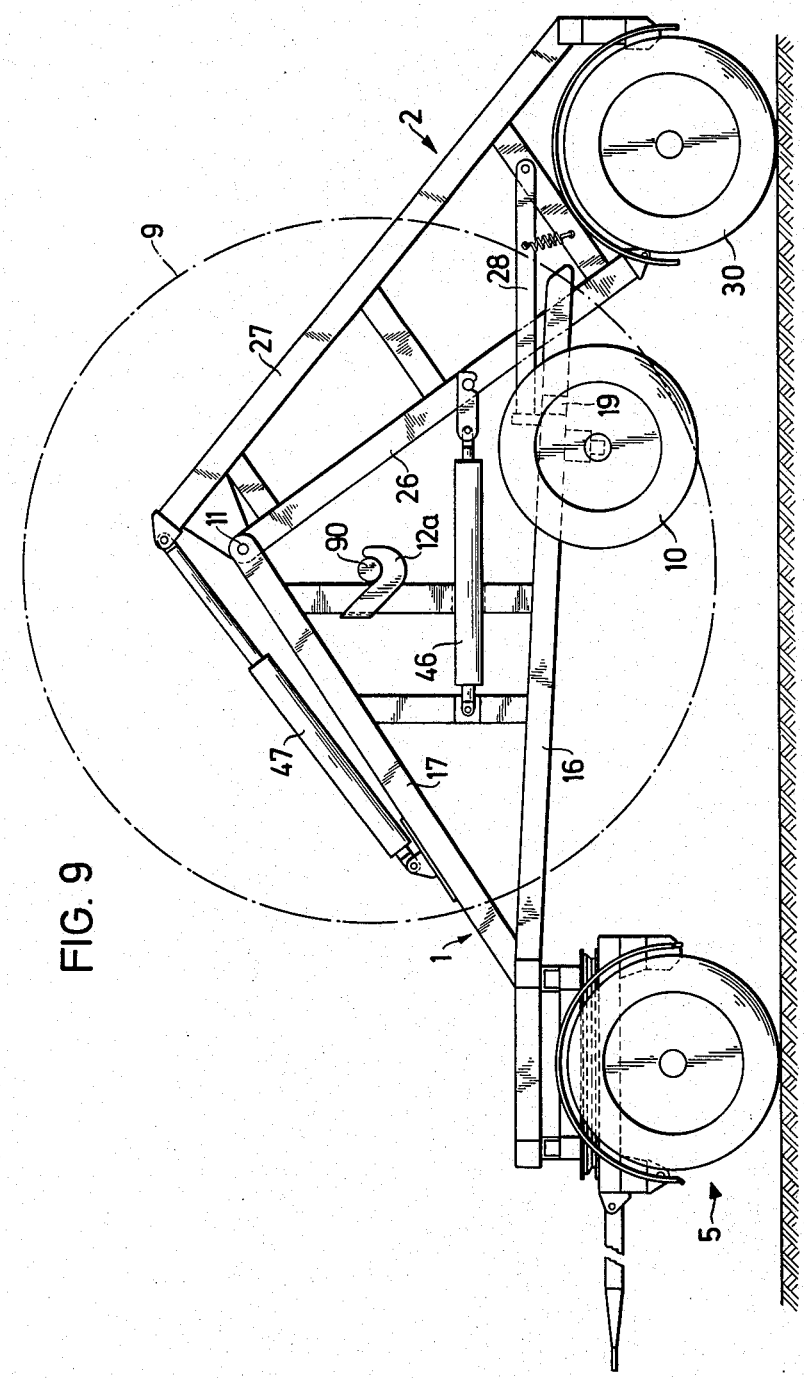
FIG. 9 is a side elevation of a two-axle trailer bearing a cable drum in position for transportation.
Figure 10:
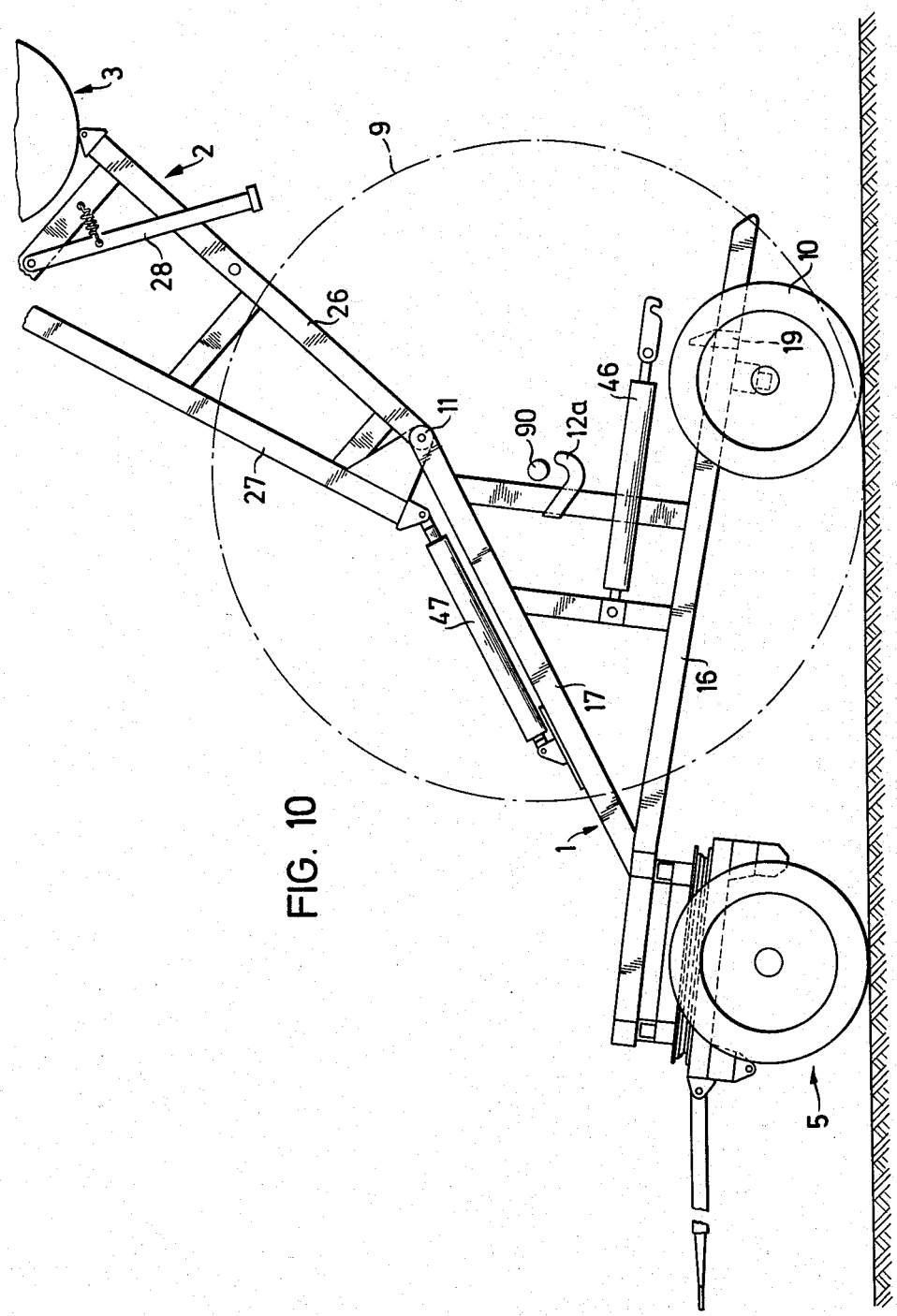
FIG. 10 is a side elevation corresponding to FIG. 9 before the receiving or after the depositing of the cable drum.

The manner of operation is similar to that described in the case of the single-axle trailer. First of all, to be sure, the lower piston rams 46 must be detached from the bars 26 and the tiebars 28 must be detached from the abutments 19. For this purpose, the piston rams 47 which in their position of transportation are located approximately in extended position (FIG. 9) are extended still further. After the loosening of the piston rams 46 and the tiebars 28, the pressure on the piston rams 47 is slowly reduced, so that the angle between the bars 17 and 26 is increased until the supporting wheels (supporting member 10) touch the ground. Thereupon, by reversing the direction of action of the pressure, the piston rams 47 are retracted, whereby a pull is exerted on the upper ends of the bars 27 and the auxiliary frame 2, together with the rear undercarriage, is swung around the swivel axis 11 into the position shown in FIG. 10. The vehicle is now moved rearward over a cable drum 9, so that the axis of said drum lies above the drum support 12a and a drum shaft 90 can be inserted. By slow release of the piston rams 47, the auxiliary frame 2 can be swung back as a result of its weight until the wheels 30, as well as the supporting wheels, touch the ground. In order that the cable drum 9 be taken up and the transportation position reached, the action of the pressure on the piston rams 47 must be reversed, so that they exert a pressure on the bars 27, whereby a forward movement of the wheels 30 is brought about, and finally the locking of the frame 1 and auxiliary frame 2 with each other by the bars 26, the abutments 19 and the attaching of the piston rams 46 in the bars 26 is made possible. Only then are the piston rams 47 released from pressure. The loaded vehicle is now in the normal position for transportation (FIG. 9).

The piston rams 46 serve to make an abnormal position of transportation possible. In order, for instance, to obtain a larger clearance above the ground over open terrain, the piston rams 46 are retracted, whereby the wheel base is shortened and the distance between pivot axis 11 and the ground is increased. The tiebars 28 and the abutments 19 can in this connection be out of engagement. They can, of course, also be formed in such a manner, that engagement is possible at different adjustable distances apart. On the other hand, it is possible in front of bridges or the like, to lower the drum until, in the extreme case, it can roll on the road, the piston rams 46 being held under tension in greater or lesser extended position.

Figure 11:
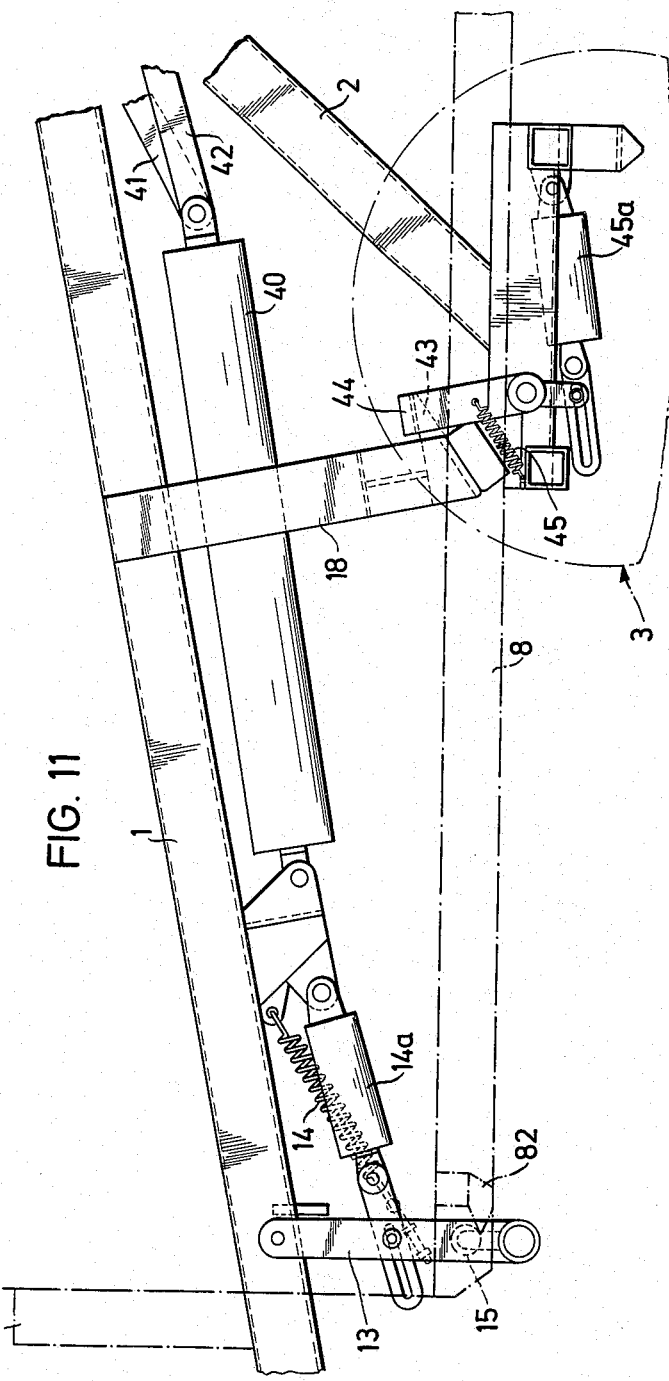
FIG. 11 is a partial side elevation similar to that of FIG. 6, with additional unlocking and locking devices, shown on a larger scale.

One embodiment of a vehicle for containers in which the frame and the auxiliary frame can be automatically locked and unlocked is shown in FIG. 11. In this case, a rearward directed nose 43 is fastened at the lower end of each of the supporting posts 18, but in front of the damping cushion. A yoke 44 which can be swung via the nose 43 is also pivoted to the auxiliary frame 2 on both sides. The yokes 44 are connected with the auxiliary frame 2 by springs 45 which urge the yokes 44 into forward swung position. The yokes 44 are developed as double-armed levers whose other arms are connected with the connecting rod of a pressure cylinder 45a. When this pressure cylinder is actuated, its connecting rod presses the yoke 44 rearward against the action of the springs 45. In this way, upon the movement to obtain the ready-for-travel condition, the contacting of the frame 1 and of the auxiliary frame 2 is made possible. By the release of the pressure cylinder 45a, the tensile force of the springs 45 is liberated and they pull the yokes 44 via the projections 43 and thus effect the mechanical interlock between the frame 1 and the auxiliary frame 2. For unlocking, the pressure cylinder 45a need merely be actuated.

The device for the automatic unlocking of the container from the vehicle can be noted from FIG. 11. Here a pressure cylinder 14a is provided in addition to the frame 1. The pressure cylinder does not enter into operation upon the receiving of the container 8 in the vehicle. This takes place in the manner described above in connection with the first example.

The pressure cylinder 14a is, however, actuated upon the depositing of the container when the auxiliary frame 2 is swung rearward and upward. In this way the yoke 13 is swung forward from the bottom of the container 8 onto the ende side of the container. During the further course of the backward swinging of the auxiliary frame 2, the front edge of the container is inclined downward until finally the mounting extensions 81 of the container come into contact with the cross member of the yoke 13. Towards the end of the swinging of the auxiliary frame 2, the front end of the frame 1 and thus also the container 8 descend slowly onto the ground, the movement taking place in reverse order to what occurs upon the receiving of the container.

The pressure cylinders 45a and 14a which are preferably constitutes as hydraulic cylinders are controlled by conventional means.

I claim:

1. A vehicle for the transportation of a container, such as a garbage container, transportation container or a cable drum, comprising:

a substantially horizontal U-shaped frame open towards its rear constituting means for receiving and depositing said container, an auxiliary frame of U-configuration connected by a pivot to said U-shaped frame at the open ends of the respective U's, an undercarriage having wheels which connects the legs of the auxiliary frame thereby forming the closed end thereof, said undercarriage further being swingable over the top of, around the rear of, and below said container when said container is engaged by said U-shaped frame in the transportation position, said pivot having a horizontal axis extending perpendicularly to the longitudinal axis of said vehicle, said U-shaped frame being provided with supporting members fixed to said U-shaped frame, said supporting members being lifted from the ground when said undercarriage is swung below said container, and in the upward swung position of said auxiliary frame the region disposed within said U-shaped frame is freely accessible from the rear.

2. The vehicle, as set forth in claim 1, further comprising fastening means for said containers disposed laterally on said frame.

3. The vehicle, as set forth in claim 2, wherein said fastening means comprises a trough-shaped container support which opens on top and arranged at a rear end of said frame and a swingable closed yoke biased by a spring and arranged on a bottom of said frame.

4. The vehicle, as set forth in claim 3, wherein a container is provided at a top in the vicinity of said rear end laterally with two suspension pins on a front end side with a holding extension, said suspensions pins cooperate with said container support and said yoke cooperates both with said holding extension and with said container itself.

5. The vehicle, as set forth in claim 4, further comprising a roller is arranged on said yoke, and said container is provided on a bottom side in the vicinity of the front end side with a projection, a roller in operative connection with said projection upon the downward swinging of said auxiliary frame into a transport position.

6. The vehicle, as set forth in claim 5, wherein
a roller is on said yoke, said yoke is adapted to be acted on by a pressure cylinder in a direction opposed to said spring in such a manner that said roller is released from said projection.

7. The vehicle, as set forth in claim 3, further comprising at leat one transverse member connecting lateral parts of said auxiliary frame, at least one rearwardly directed projection arranged on a bottom side substantially in the center of the container, at least one yoke disposed on said transverse member which, upon a forward movement of said auxiliary frame, grips around said projection below and relative to said frame.

8. The vehicle, as set forth in claim 1, wherein
said vehicle is in the form of a single-axle trailer, said supporting members are formed as supporting wheels arranged in a rear end portion of said frame, and said auxiliary frame is pivotable in front of said supporting wheels.

9. The vehicle, as set forth in claim 8, further comprising an upper link pivoted to said frame, a lower link pivoted to said auxiliary frame, a swinging device arranged on both sides of said vehicle and comprising one piston ram each arranged on said frame and on said upper and said lower link.

10. The vehicle, as set forth in claim 8, further comprising at least one transverse member connecting lateral parts of said auxiliary frame, at least one upward-directed locking hook is arranged on said transverse member, and a locking bolt is arranged on a bottom of the container, adapted to be brought into engagement with each other upon a backward swinging of said auxiliary frame.

11. A vehicle for the transportation of containers, such as garbage containers, transportation containers and cable drums, comprising:

a U-shaped frame open towards its rear constituting means for receiving and depositing said containers, an auxiliary frame connected by a pivot to said U-shaped frame and swingable over around and below said containers to be received, said pivot having a horizontal axis extending perpendicularly to the longitudinal axis of said vehicle, said auxiliary frame being provided with an undercarriage, and said U-shaped frame resting on supporting members in the upward swung position of said auxiliary frame such that the region disposed within said U-shaped frame is freely accessible from the rear, said vehicle being a two-axle vehicle, said frame and said auxiliary frame being formed by a lateral supporting structure comprising a lattice work including first and second upper bars and first and second lower bars, said first upper bars being shorter than said first lower bars and are pivoted to said second lower bars which are shorter than said second upper bars.

12. The vehicle, as set forth in claim 11, wherein
two piston rams each connecting said frame and said auxiliary frame are connected with each other, said piston rams comprising an upper piston ram acting on a front end of said second upper bars, and a lower piston ram acting substantially in the middle of said second lower bars.

13. The vehicle, as set forth in claim 12, wherein
said piston rams are connected removably to said second lower bars.

14. The vehicle, as set forth in claim 11, wherein
said first lower bars of said frame are connectable with said second lower bars of said auxiliary frame in different positions.

15. The vehicle, as set forth in claim 1, further comprising supporting post means supporting said frame on said auxiliary frame in a transport position, a separate projection fastened on each supporting post means, and a separate yoke is fastened on each side of said auxiliary frame, said separate yoke and separate projection adapted to be brought into engagement with each other, said separate yokes engaging over said separate projections, said separate yoke and said separate projection for locking said frame to said auxiliary frame in said transport position.

16. The vehicle, as set forth in claim 15, wherein
said separate yokes are pivotable, springs and a pressure cylinder operatively connecting said separate yokes and said auxiliary frame, said springs acting on said separate yokes for locking, and said pressure cylinder acting on said separate yokes for unlocking.

* * * * *